United States Patent
Golowich et al.

(10) Patent No.: US 7,110,651 B2
(45) Date of Patent: Sep. 19, 2006

(54) OPTICAL FIBER HAVING ENHANCED SEPARATION OF HIGHER-ORDER MODES

(75) Inventors: Steven Eugene Golowich, Lexington, MA (US); Siddharth Ramachandran, Hoboken, NJ (US)

(73) Assignees: Lucent Technologies Inc., Murray Hill, NJ (US); Fitel USA Corp., DE (US)

( * ) Notice: Subject to any disclaimer, the term of this patent is extended or adjusted under 35 U.S.C. 154(b) by 126 days.

(21) Appl. No.: 10/922,684

(22) Filed: Aug. 19, 2004

(65) Prior Publication Data

US 2006/0039663 A1 Feb. 23, 2006

(51) Int. Cl.
*G02B 6/02* (2006.01)
*G02B 6/36* (2006.01)

(52) U.S. Cl. ............. 385/126; 385/28; 385/37; 385/127

(58) Field of Classification Search ............ 385/28, 385/37, 123, 126, 127
See application file for complete search history.

(56) References Cited

U.S. PATENT DOCUMENTS 6,625,364 B1* 9/2003 Johnson et al. ............. 385/127

6,711,334 B1* 3/2004 Szkopek et al. ............. 385/127

OTHER PUBLICATIONS

Yun, S.H., et al., "Dynamic Erbium-Doped Fiber Amplifier Based on Active Gain Flattening with Fiber Acoustooptic Tunable Filters," *IEEE Photonics Technology Letters*, vol. 11, No. 10, pp. 1229-1231, Oct. 1999.
Dimmick, T.E., et al., "Compact All-Fiber Acoustooptic Tunable Filters with Small Bandwidth-Length Product," *IEEE Photonics Technology Letters*, vol. 12, O. 9, pp. 1210-1212, Sep. 2000.
Poole, C.D., et al., "Helical-Grating Two-Mode Fiber Spatial-Mode Coupler," *Journal of Lightwave Technology*, vol. 9, No. 5, pp. 598-604, May 1991.

* cited by examiner

Primary Examiner—Akm Enayet Ullah
Assistant Examiner—Daniel Petkovsek
(74) Attorney, Agent, or Firm—M. I. Finston

(57) ABSTRACT

A new annular-core optical fiber is useful, inter alia, for stabilizing the behavior of an optical attenuator based on a Long Period Grating (LPG) against fluctuations in the polarization of the fundamental optical signal. The fiber dimensions and $\Delta n$ are selected such that when a LPG of some period is used to couple fundamental-mode radiation in the fiber into higher-order modes, the wavelength of peak coupling into an HE mode is removed by at least 30 nm from the wavelength of peak coupling into the nearer of a TE mode or a TM mode.

4 Claims, 3 Drawing Sheets

OPTICAL FIBER HAVING ENHANCED SEPARATION OF HIGHER-ORDER MODES

FIELD OF THE INVENTION

This invention relates to optical fibers having refractive index profiles that are tailored to achieve specific types of modal behavior.

ART BACKGROUND

Long period gratings (LPGs) are known to be useful for attenuating the light guided in the fundamental mode of a single-mode optical fiber. An LPG operates by providing a periodic perturbation that couples light from the fundamental, $LP_{01}$ mode of the fiber into higher-order modes. The higher-order modes may be core-guided, cladding-guided or radiative. If not inherently radiative, higher-order modes are readily stripped from the fiber by bends, tapers, or other well-known extractive elements.

The resonant wavelength at which the LPG is most effective for modal coupling depends upon the period of the LPG, which can be selected by design. The strength of the coupling is subject to control when, for example, the LPG is induced by periodic microbends which are mechanically created by an adjustable, serrated clamp in contact with the fiber. Because both the resonant wavelength and the coupling strength are subject to control, an LPG is a useful building block for important optical elements such as gain-flattening filters.

Although useful for purposes such as optical attenuation and optical filtering, the LPG is known to suffer certain drawbacks. Specifically, when microbends are used to induce the LPG, the modal coupling induced by the LPG is polarization-dependent. For example, it is often desirable to use an LPG to couple $LP_{01}$ radiation into the mode (actually a scalar modal approximation) designated $LP_{11}$. The $LP_{11}$ mode comprises a triplet of exact modal solutions having different polarizations, denominated TM, HE, and TE. (The HE component, in turn, is a doublet whose individual components have mutually orthogonal polarizations.) Each of the three $LP_{11}$ components TM, HE, and TE will generally resonate with a given LPG at a slightly different wavelength. At each of these resonances, a locally maximum amount of power may be transferred from the fundamental mode to the higher-order mode. Coupling into the HE component is substantially independent of the state of polarization of the input fundamental-mode radiation. At a certain polarization of the fundamental mode, however, coupling into TM will be mostly suppressed, whereas at the orthogonal polarization, coupling into TE will be mostly suppressed. Because the fundamental polarization fluctuates randomly in many practical fiber-optic transmission systems, the optical attenuation produced by the LPG is found to be unstable in such systems.

Thus, there has been a need for some way to stabilize the behavior of an LPG-based optical attenuator.

SUMMARY OF THE INVENTION

We have found a new optical fiber which stabilizes the behavior of an LPG-based optical attenuator against fluctuations in the polarization of the fundamental optical signal. Our new fiber has an annular region enclosed between a central region and a cladding region. The central and cladding regions have substantially the same refractive index, and the annular region has a refractive index which is elevated by an amount $\Delta n$ relative to the central and cladding regions. The position and width of the annular region are determined by an inner radius $r_1$ and an outer radius $r_2$. The parameters $\Delta n$, $r_1$, and $r_2$ are selected such that when a LPG of some period is used to couple fundamental-mode radiation in the fiber into higher-order modes, the wavelength of peak coupling into an HE mode is removed by at least 30 nm from the wavelength of peak coupling into the nearer of a TE mode or a TM mode.

In specific embodiments of the invention, $\Delta n$ is at least 0.015, $r_1$ is at least 2 micrometers but not more than 8 micrometers, and $r_2 - r_1$ is no more than 2 micrometers.

DETAILED DESCRIPTION

Figure 1:
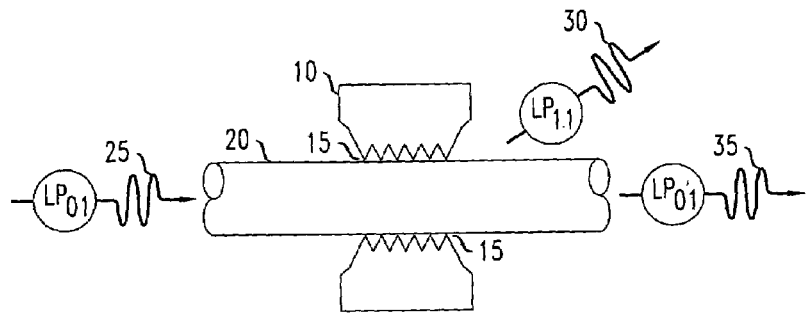
FIG. 1 is a schematic illustration of the use of a mechanical Long Period Grating (LPG) in accordance with methods of the prior art.

FIG. 1 illustrates the conventional use of mechanical LPG 10. Teeth 15 of the LPG are applied to the outside of single-mode optical fiber 20 with adjustable pressure. Optical signal 25 is injected into fiber 20 as $LP_{01}$, or fundamental-mode, radiation. Due to interaction with the LPG, some of the optical power in signal 25 is coupled into higher-order modes, such as the modes collectively designated $LP_{11}$. The optical power in the $LP_{11}$ modes is stripped from the fiber via an appropriate element (not shown) such as a bend or taper, or by splicing this fiber to a single-mode fiber that does not guide the $LP_{11}$ mode. The stripped $LP_{11}$ radiation escapes from the fiber as indicated by reference numeral 30 in the figure. An attenuated fundamental-mode signal 35 remains guided within the fiber.

As noted, $LP_{11}$ designates a scalar modal approximation that actually comprises TM, HE, and TE modes. More specifically, $LP_{11}$ splits into $TM_{01}$, $HE_{21}$, and $TE_{01}$ components, $LP_{12}$ similarly splits into $TM_{02}$, $HE_{22}$, and $TE_{02}$, and in general, $LP_{1m}$ splits into $TM_{0m}$, $HE_{2m}$, and $TE_{0m}$. In the general expression $LP_{lm}$, l designates azimuthal order and m designates radial order of the mode. A microbend-induced LPG can couple the fundamental mode, which is symmetric, only to such higher-order modes as are anti-symmetric. An azimuthal order of 1 is the lowest antisymmetric order.

Figure 2:
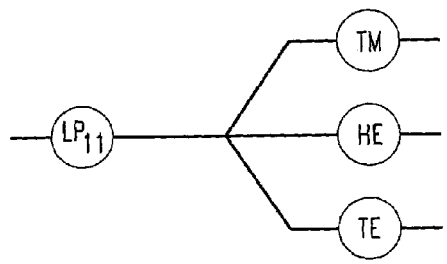
FIG. 2 is a schematic illustration of the splitting of $LP_{11}$ scalar modal approximation into TM, HE, and TE exact modal solutions.
Figure 3:
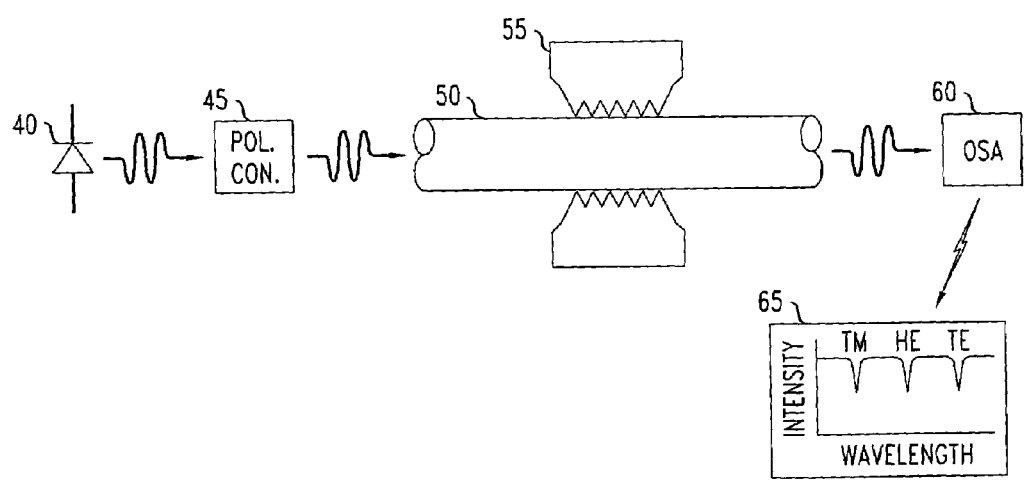
FIG. 3 is a schematic illustration of an optical system in which splitting of the TM, HE, and TE modal solutions is effectuated by an appropriate fiber-LPG combination and measured by an Optical Spectrum Analyzer (OSA).

FIG. 2 illustrates the splitting of, e.g., $LP_{11}$ into TM, HE, and TE. In practice, such splitting can be effectuated by an LPG, as illustrated in FIG. 3. In the arrangement of FIG. 3, broadband LED 40 emits light into polarization controller 45, whence the polarization-controlled light is injected as fundamental-mode radiation into filber 50 and subjected to LPG 55. After stripping of the higher-order modes, the residual fundamental-mode radiation is directed into optical spectrum analyzer 60, which produces optical power spectrum 65. The optical power spectrum will exhibit a respective dip in the vicinity of each wavelength at which a resonance occurred, resulting in extraction of some fundamental-mode power into a TM, HE, or TE mode. By appropriate adjustment of polarization controller 45, the TM dip or the TE dip can be at least partially suppressed.

Mathematically, the resonant wavelengths $\lambda_{res}$ are described by the formula $\lambda_{res}=\Lambda(n_{01}-n_{mode})$, wherein $\Lambda$ is the period of the LPG, $n_{01}$ is the effective refractive index of the fiber for fundamental-mode radiation, and $n_{mode}$ is the effective refractive index of the fiber for TM, HE, or TE radiation.

Figure 4:
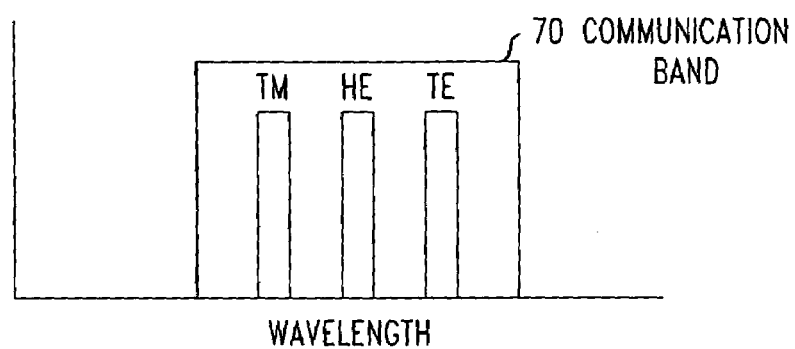
FIG. 4 is a schematic representation of TM, HE, and TE modal resonances as they might appear in the spectrum of light stripped from the optical fiber used in a conventional LPG-based optical attenuator.

FIG. 4 shows, in a manner that is schematic and not to scale, the three modal resonances as they might appear in the spectrum of light stripped from a conventional communication fiber in a conventional LPG-based attenuator. Superimposed on the three modal resonances is an envelope 70 representing a typical communication wavelength band, such as the C-band which extends from 1.530 to 1.565 micrometers. In the figure, the three resonances are seen to fall within the communication band. Typically, the TM and TE resonances in a conventional such device are separated by a wavelength span of 0.1 to 5 nm.

Figure 5:
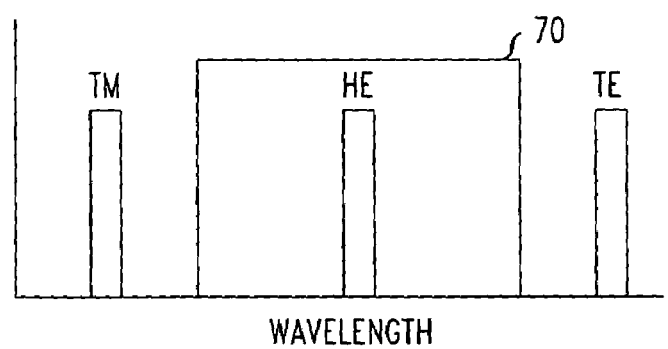
FIG. 5 is a schematic representation of TM, HE, and TE modal resonances as they might appear in the spectrum of light stripped from an optical fiber of the kind described herein when it is used in an LPG-based optical attenuator.

It is desirable to achieve a spectral separation between the modal resonances great enough so that only the HE resonance falls within the communication wavelength band of interest. If such a separation can be achieved, the polarization dependence of the TM and TE resonances will be of no account, because any optical attenuation due to those resonances will occur only at wavelengths that are excluded from the detectors in the fiber-optic transmission system. Such a separation is illustrated in FIG. 5, in which reference numeral 70 again denotes a communication wavelength band. For convenience, the HE resonance has been shown as falling in the middle of band 70. In general, however, the specific placement of the HE resonance within the communication band will depend on the specific application of the LPG.

Figure 6:
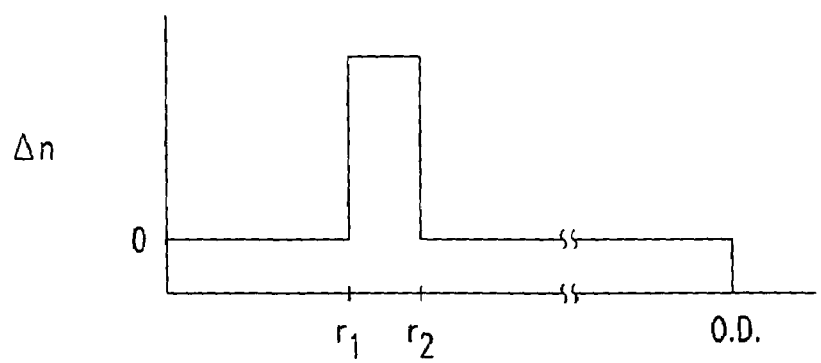
FIG. 6 is a graph of the refractive-index profile of an illustrative annular-core optical fiber of the kind described herein.

By way of example, a particular optical fiber embodying the principles of the present invention has an undoped silica central region, a germania-doped annular core region, and a single undoped cladding region. The annular core region has a $\Delta n$ of 0.02 and extends from $r_1=3.89$ micrometers to $r_2=5.51$ micrometers, so that $r_2-r_1$ is 1.62 micrometers. The outer diameter (O.D.) of the cladding region is typically 125 micrometers, but any outer diameter is acceptable provided the air interface is far enough removed that it does not interfere with the modal behavior. In this regard, outer diameters of 100 micrometers, or even less, are acceptable. The fiber is conventionally drawn from a preform made by, e.g., conventional MCVD fabrication methods. The refractive-index profile of such a fiber is illustrated in FIG. 6. The spectral characteristics of a fiber dimensioned as described above are discussed below with reference to FIG. 7.

More generally, simulations and experimental measurements have led us to believe that an optical fiber similar to that described above will exhibit the advantageous properties described here, and thus will fall within the scope of the present invention, if $\Delta n$ is at least 0.015, $r_2-r_1$ is at most 2 micrometers, and $r_1$ is at least 2 micrometers but no more than 8 micrometers.

Although it is most common to use silica fibers with germania-doped silica cores, the fiber composition is not critical, nor is the particular fabrication technique used to make the fiber preform. Typically, the central and cladding regions will be undoped and the annular region will be doped to elevate its refractive index. However, all three regions may be doped, or indeed the annular region may be undoped and the central and cladding regions doped to reduce their refractive indices. It is essential only that the annular region have a refractive index elevated by $\Delta n$ relative to the other two regions.

EXAMPLE

Figure 7:
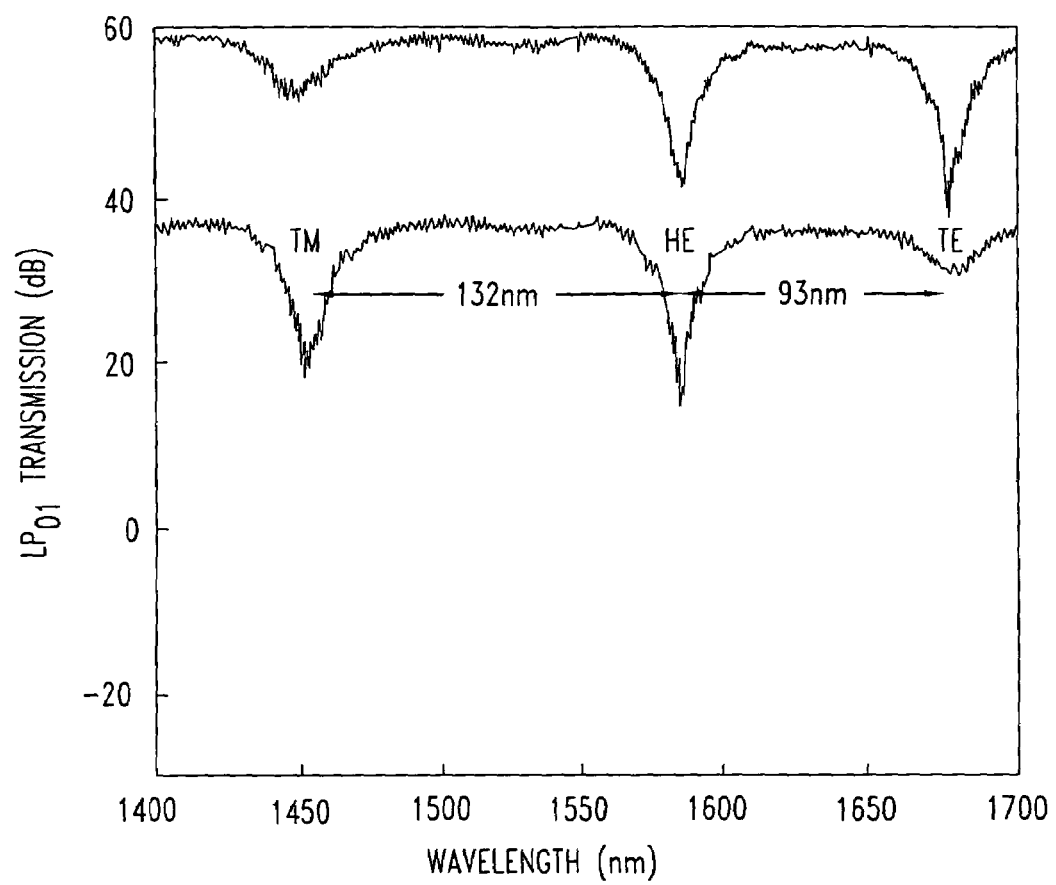
FIG. 7 is a graph showing a pair of measured spectra of the fundamental-mode radiation transmitted by an illustrative fiber subjected to a LPG and then stripped of the higher-order modes.

In FIG. 7, we have plotted a pair of measured spectra of the fundamental-mode radiation transmitted by an illustrative fiber as described in detail above, subjected to a LPG and then stripped of the higher-order modes. In the upper of the two spectra as shown in the figure, the linear polarization of the light injected into the fiber was adjusted to maximize the amount of TE light removed from the fiber. In the lower of the two spectra, the polarization was adjusted to maximize the amount of TM light that was removed. The spectra shown in the figure were measured using an arrangement similar to that of FIG. 3.

The spectra of FIG. 7 show that the particular optical fiber that was used achieved a separation of 132 nm between the TM and HE peaks, and a separation of 93 nm between the HE and TE peaks. It should be noted that the smaller of the two separations—here, the HE–TE separation of 93 nm—is the more useful as a figure of merit in the present context.

In at least some of the fibers we measured, we also observed a very small splitting of the HE peak. That splitting is too small to be clearly resolvable in the spectra of FIG. 8. We attribute that splitting to unintentional ovality in the fibers that we used, which evidently can introduces a sufficient polarization-dependent perturbation to resolve the degeneracy of the HE mode.

In a group of fibers in which $r_1$ ranged from 2.88 to 3.89 micrometers, we measured a separation between the HE and TE resonances (which in all cases, was smaller than the HE–TM separation) which increased from 53 nm at the lowest value of $r_1$ to 93 nm at the highest value of $r_1$. The high value is that represented in FIG. 8. As noted, even modal separations as low as 30 nm will be useful in the present context.

We claim:

1. An optical fiber comprising central and cladding regions having a first refractive index and having respectively an outer radius $r_1$ and an inner radius $r_2$, and juxtaposed between said regions an annular region having a second refractive index elevated above the first refractive index by an amount $\Delta n$, wherein:

$r_1$, $r_2$, and $\Delta n$ are selected such that when a long-period grating (LPG) of some period is used to couple fundamental-mode radiation in the fiber into higher-order modes of some radial order m, the wavelength of peak coupling into an $HE_{2m}$ mode is removed by at least 30 nm from the wavelength of peak coupling into the nearer of a $TE_{0m}$ mode or a $TM_{0m}$ mode.

2. The optical fiber of claim 1, wherein $\Delta n$ is at least 0.015, $r_1$, is at least 2 micrometers but not more than 8 micrometers, and $r_2-r_1$, is no more than 2 micrometers.

3. The optical fiber of claim 1, wherein $\Delta n$ is approximately 0.02, $r_1$ is approximately 3.6 micrometers, and $r_2 - r_1$ is approximately 1.5 micrometers.

4. The optical fiber of claim 1, wherein m=1.

* * * * *